March 3, 1964

J. HALLER 3,122,915

TORSION TESTING MACHINE

Filed Jan. 16, 1961

INVENTOR.
JOHN HALLER
BY
Barthel & Bugbee
ATTORNEYS

March 3, 1964 J. HALLER 3,122,915
TORSION TESTING MACHINE
Filed Jan. 16, 1961 3 Sheets-Sheet 2

INVENTOR.
JOHN HALLER
BY
Barthel & Bugbee
ATTORNEYS

United States Patent Office 3,122,915
Patented Mar. 3, 1964

3,122,915
TORSION TESTING MACHINE
John Haller, Northville, Mich.
Filed Jan. 16, 1961, Ser. No. 82,832
6 Claims. (Cl. 73—99)

This invention relates to testing machines and, in particular, to torsion testing machines.

One object of this invention is to provide a torsion testing machine which is adapted to determine the ductility and strength of a material by twisting a sample of fixed size between one stationary and one rotating jaw.

Another object is to provide a torsion testing machine of the foregoing character wherein the degree of twist and the torsional force required to produce that twist are recorded graphically, thereby giving a written record of the degree of twist and torsional force exerted to produce it.

Another object is to provide a torsion testing machine of the foregoing character wherein the torsional force for effecting the twist is produced by a torsional hydraulic motor, the fluid pressure supplied to which is recorded, along with the degree of twist, the resulting curve or graph producing a characteristic loop or dip at the time and twist where the elastic limit of the material of the sample is exceeded, thereby providing a detailed record of the behavior of the material before, during and after failure.

Another object is to provide a torsion testing machine of the foregoing character wherein the graphic record is made on a drum which turns simultaneously with the sample, the resulting graph being preferably traced out by a pressure-responsive needle or pen upon a sheet of suitable recording material, such as paper.

Other objects and advantages of the invention will become apparent during the course of the following description of the accompanying drawings, wherein.

Figure 1:
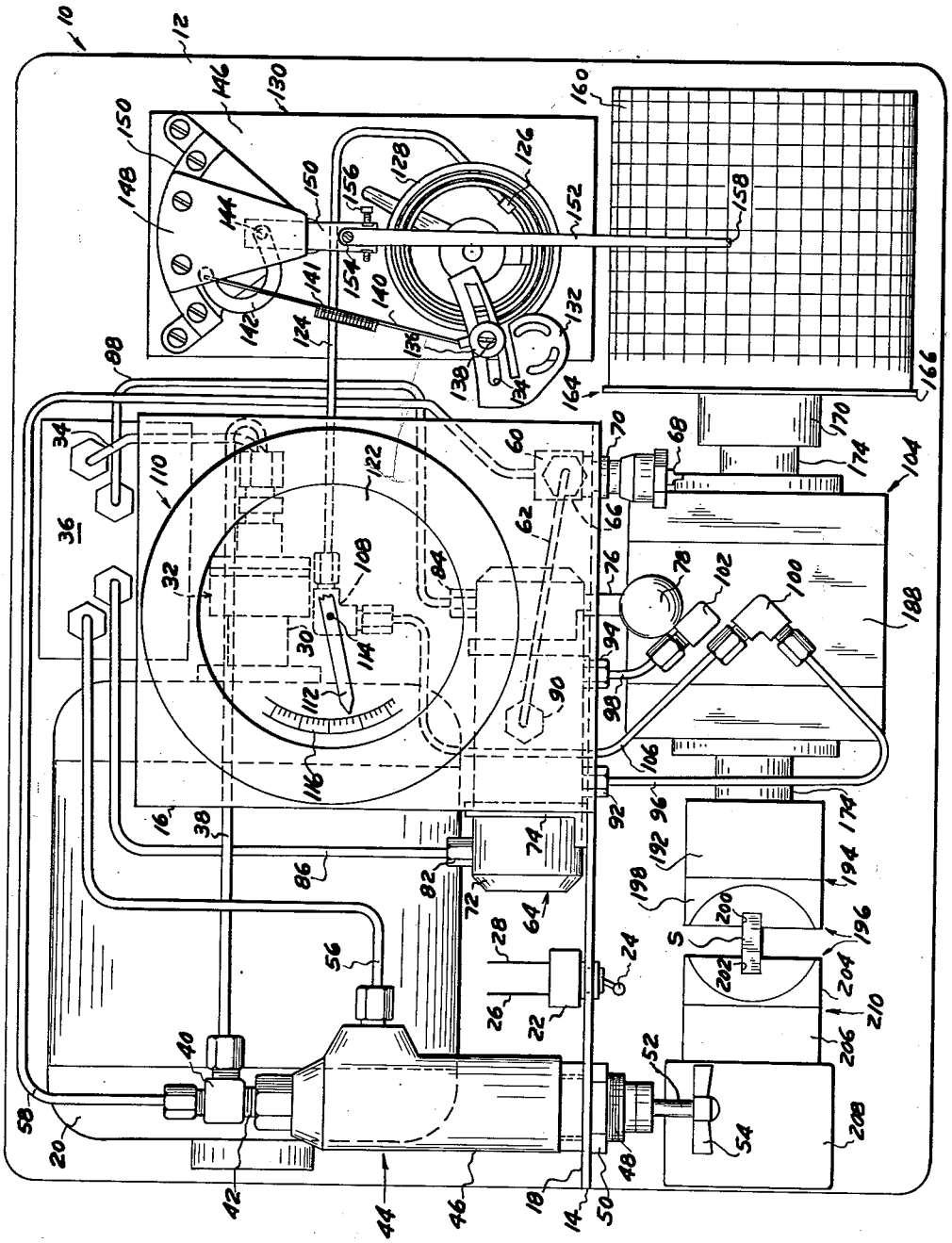
FIGURE 1 is a top plan view of a torsion testing machine, according to one form of the invention, with portions of the enclosing housing omitted to disclose the parts beneath.
Figure 2:
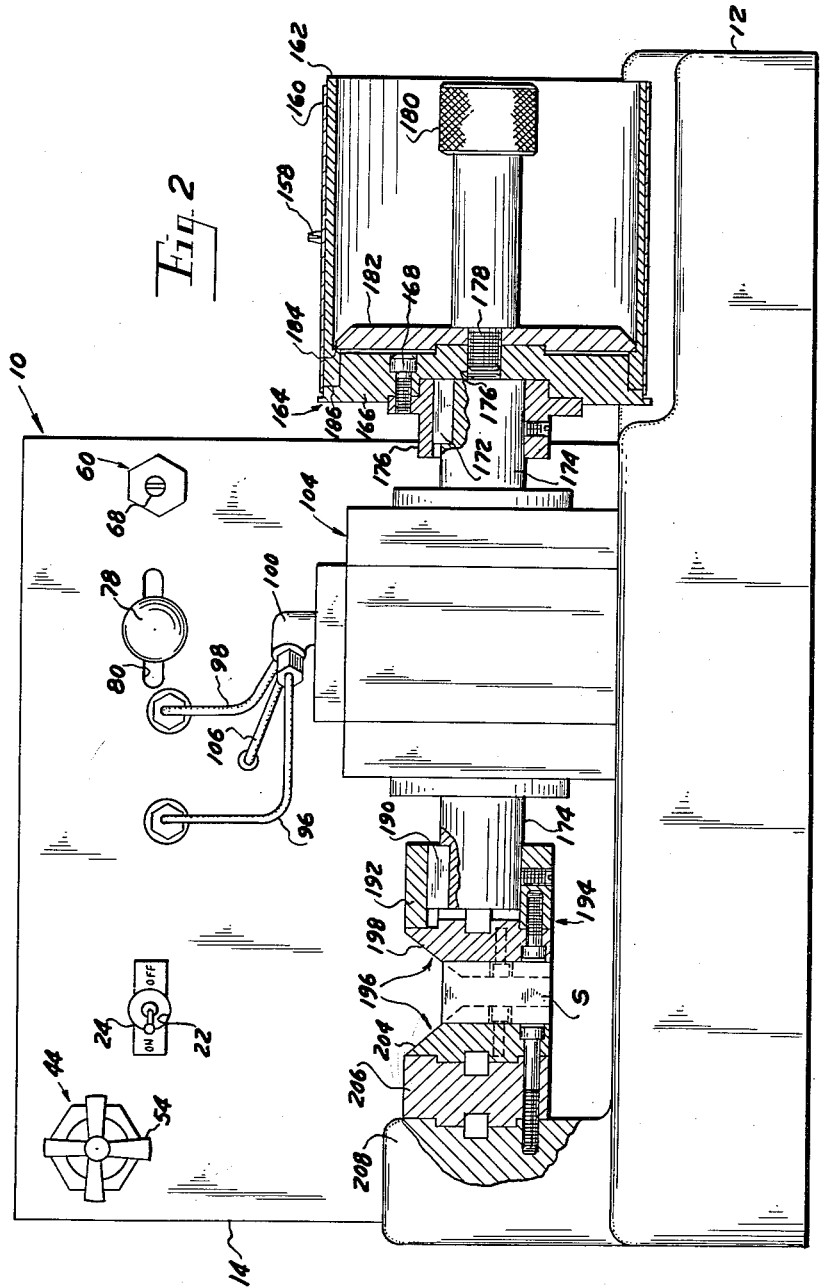
FIGURE 2 is a front elevation of the torsion testing machine of FIGURE 1, with the sample-holding jaws and the record-holding drum in central vertical section.

Referring to the drawings in detail, FIGURES 1 and 2 show a torsion testing machine, generally designated 10, according to one form of the invention, as mounted on a base 12, with parts supported by a vertical panel 14 secured to and rising from the base 12, intermediate its forward and rearward edges and terminating short of the right-hand end of the base 12. The vertical panel 14 at the middle portion of the base 12, namely at approximately the right-hand half of the panel 14, is provided with a shelf 16 extending rearwardly from the top edge 18 thereof. This shelf 16 in practice is separate from the panel 14 and secured by suitable fasteners to its upper edge 18, but is shown as integral with the vertical panel 14 for purposes of simplification. The horizontal shelf 16, like the vertical panel 14, also serves a part-supporting function, as explained in more detail below. The shelf 16 and panel 14, in practice, are also strengthened by brackets or braces (not shown) extending between them and the base 12 for imparting the necessary strength and rigidity to the structure, these braces having been omitted from the drawings in order to simplify the showing.

Mounted on the base 12 near the rearward left-hand corner thereof is an electric motor 20 (FIGURE 1) supplied with electric current from a suitable source, such as an ordinary wall outlet through a flexible cable (not shown), by way of a control switch 22 mounted on the vertical panel 14 and having operating arm or handle 24. The conductors 26 and 28 entering and leaving the switch 22 have been abbreviated in order to avoid adding confusion to FIGURE 1 of the drawings, by conflicting with the hydraulic piping. The armature shaft 30 of the electric motor 20 is drivingly connected to a conventional hydraulic pump 32, such as a conventional gear pump, the suction side of which is connected by a suction pipe 34 to an oil tank 36 which constitutes the hydraulic working fluid reservoir, the term "hydraulic" being used, of course, in its generic sense rather than confined merely to water.

The pressure side of the pump 32 discharges into a discharge or pressure pipe 38 which proceeds to a T coupling 40 from one arm of which a lateral branch pipe 42 extends to a conventional pressure relief valve 44. The pressure relief valve 44 is also conventional and is provided with an elongated casing 46, the threaded forward end 48 of which extends through the vertical panel 14 and is secured thereto by a nut 50 threaded upon the threaded portion 48. A pressure adjusting shaft 52 terminating in a hand wheel 54 projects from the threaded end portion 48 of the casing 46, and, when rotated in one direction or the other, increases or decreases the pressure at which the relief valve 44 will operate to release pressure fluid through an auxiliary discharge pipe 56 connected at one end to the valve casing 46 and at its other end discharging into the tank 36.

From the remaining arm of the T coupling 40, a main pressure discharge pipe 58 proceeds to the intake side of a conventional flow control valve or throttle valve 60 of any suitable type, such as an adjustable needle valve, from the outlet side of which the main discharge pipe 62 continues to the central or inlet port of a conventional four-way directional or distribution valve 64. The flow control valve 60 has a casing 66 internally-threaded to receive a correspondingly-threaded flow regulating needle or pointed pin 68 in the form of a screw which when turned in one direction or the other decreases or increases the flow through the valve 60 in a known manner. The casing 66 also extends through the vertical panel 14 and is threaded to receive a mounting nut 70.

The four-way directional or distribution valve 64 has an elongated casing 72 mounted on angle brackets 74 secured to the vertical panel 14 (FIGURE 1) and is of any suitable conventional type, the well-known four-way reciprocable piston valve being suitable for this purpose. As is familiar to hydraulic engineers, such a valve consists of an elongated cylinder, namely the casing 72, in which a piston with multiple heads (not shown) is reciprocably mounted so as to selectively uncover one of two pairs of ports while covering the other pair for forward or reverse direction of fluid flow. For this purpose, a horizontally-swinging handle 76 equipped with a hand knob 78 extends through an elongated slot 80 in the vertical panel 14 from the valve casing 72 and is connected to the piston thereof for reciprocating that piston.

Near its opposite ends, the four-way valve casing 72 is provided with threaded fluid discharge or return port couplings 82 and 84 from which fluid discharge or return pipes 86 and 88 run back to the tank 36. To the threaded middle port coupling 90 in the four-way valve casing 72 is connected one end of the pipe 62, the other end of which is connected to the flow control valve 60, as stated above. Located between the end port couplings 82 and 84 and the middle port coupling 90 and on opposite sides of the latter are two pressure fluid service port couplings 92 and 94 from which service pipes 96 and 98 run to service port couplings 100 and 102 respectively of rotary hydraulic torsion motor 104. From the service port coupling 100, which is the forward-rotation port coupling of the torsion motor 104, an auxiliary or branch pipe 106 leads through the vertical panel 14 to one arm of a coupling 108 on the bottom of a hydraulic pressure gauge 110 equipped with a rotary pressure indicating needle 112 mounted on a rotary shaft 114 and registering with an arcuate or circular graduated pressure scale 116. The pressure gauge 110 is mounted on and supported by the shelf 16 which in turn is supported by the panel 14. The scale 116 is mounted on a dial 122.

Running from the remaining arm of the pressure gauge coupling 108 is a branch pipe 124 which terminates at one end 126 of a flat spiral pressure-responsive tube 128 forming the motive element of a conventional recording needle device, generally designated 130. The free end of the pressure-responsive spiral tube 128 is connected to an arm 132 which is arcuately slotted as at 134 to adjustably receive a rod coupling 136 clamped by a clamp screw 138 in its adjusted position along the arcuate slot 134. Connected to the rod coupling 136 is one end of a motion-transmitting rod or wire 140 containing a stiff safety spring which transmits normal motion but which yields to excessive push or pull by arching or stretching. The opposite end of the rod 140 is pivotally connected to the outer end of a C-shaped bent lever 142, the inner end of which is connected to a vertical rotary needle shaft 144 which is journaled at its opposite ends in a base plate 146 and a top plate 148. The top plate 148 is bolted to a vertical supporting bracket 150 which in turn is bolted to the base plate 130. Mounted on and swinging with the vertical needle shaft 144 is a needle-carrying arm 150 to which the inner end of a recording needle 152 is secured by the pivot screw 154 and the adjusting screw 156.

The needle 152 carries an ink reservoir (not shown) which supplies ink to a pen 158 at the outer end thereof adapted to rest upon and inscribe a record line or graph upon a chart or record sheet 160 secured to a hollow cylindrical rim 162 (FIGURE 2) of a rotary record sheet supporting drum 164 which also constitutes a sample angle-of-twist indicator. The rim 162 is secured to an annularly-rabbetted end plate or disc 166 which in turn is secured by screws 168 to a hub or collar 170 keyed as at 172 to one end of the output shaft 174 of the hydraulic torsion motor 104. The end disc 166 is centrally bored and threaded as at 176 to receive the threaded reduced-diameter end portion 178 of a knurled-headed retaining screw 180 which also passes through a clamping or retaining disc 182. The latter engages an annular internal shoulder 184 on the cylindrical periphery 162 of the drum 164 and urges it into the annular rabbet 186 thereof (FIGURE 2).

Figure 3:
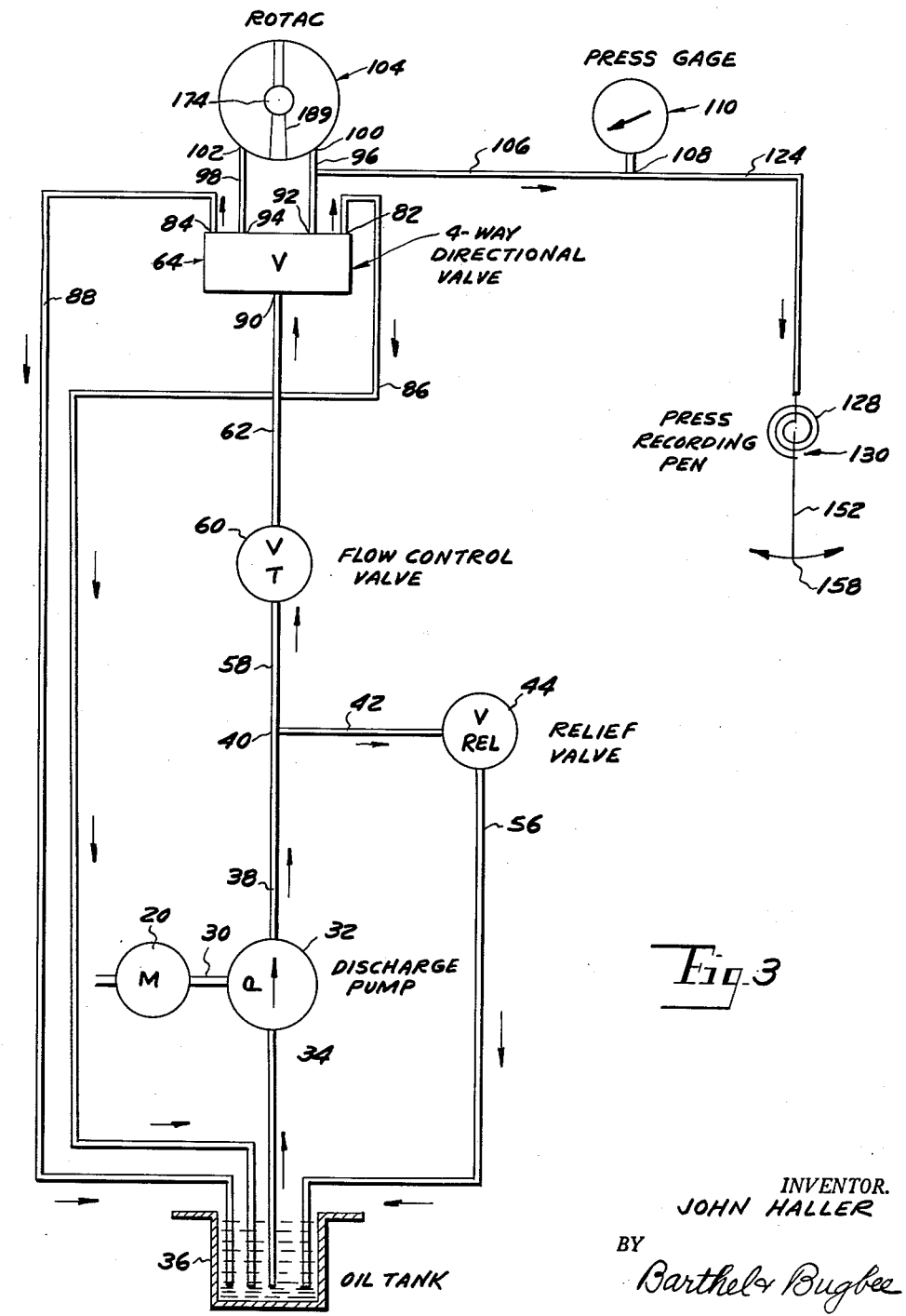
FIGURE 3 is a diagram of the operating and recording circuit of the torsion testing machine of FIGURES 1 and 2.

The shaft 174 of the hydraulic torsion motor 104 extends through the casing 188 thereof and in its interior carries a vane or rotor 189, indicated diagrammatically in FIGURE 3. The vane 189 swings in one direction or the other, depending upon whether pressure fluid is supplied to one or the other of the service port couplings 100 or 102 and fluid simultaneously drained off from the other coupling 102 or 100 respectively. The hydraulic torsion motor 104 is conventional and may be one of a number of types available on the market. One such hydraulic torsion motor which has been found satisfactory for that purpose is the so-called "Rotac" rotary or oscillating torque actuator manufactured by the Ex-Cell-O Corporation of Detroit, Michigan at its Greenville, Ohio plant.

Mounted on and keyed as at 190 to the opposite end of the output shaft 174 of the hydraulic torsion motor 104 is the collar 192 of the rotary jaw 194 of the sample or specimen holder, generally designated 196. Bolted to the collar 192 is the rotary sample gripper 198 which is slotted as at 200 to receive one end of the sample or specimen S, which is of a predetermined shape and dimensions, a rectangular shape having been found suitable for this purpose. The opposite vertical edge of the sample or specimen S to be tested is lodged in the corresponding vertical groove 202 of the stationary sample gripper 204 which in turn is bolted and keyed to a cylindrical block 206 similarly bolted and keyed to a vertical post 208 rising from and preferably integral with the base 12. The stationary gripper 204 and block 206 collectively form the stationary sample or specimen jaw 210.

In the operation of the torsion testing machine 10 of the present invention, the sample or specimen S of the material to be tested is formed to the proper dimensions, and inserted in the grooves 200 and 202 of the rotary and stationary jaws 194 and 210 respectively of the specimen or sample holder 196. The handle 76 of the four-way directional or distribution valve 64 is swung by its knob 78 in the proper direction to cause the valve 64 to supply pressure to the forward service port coupling 100 of the hydraulic torsion motor 104 and discharge it from the reverse service port coupling 102 back to the tank 36. The pressure relief valve 44 is set for the desired blowoff pressure by rotating the hand wheel 54, and the flow control valve 60 similarly set for the desired flow by adjusting the threaded needle or stem 68.

The electric control switch 22 is then shifted to its "On" position by means of its handle 24, thereby energizing the electric motor 20, the consequent rotation of the armature shaft 30 of which drives the pump 32 and causes it to draw in fluid from the tank 36 through its suction pipe 34 and to discharge pressure fluid through its main discharge or supply pipe 38. The pressure fluid continues through the pipe 58, flow control valve 60 and pipe 62 to the middle port coupling 90 of the four-way directional or distribution valve 64 which by the previously-mentioned adjustment causes pressure fluid to be discharged through the pipe 96 to the forward port coupling 100 of the hydraulic torsion motor 104 while fluid is discharged from the opposite side of the vane 189 thereof by way of the service port coupling 102, pipe 98, service port coupling 94, discharge port coupling 84 and drain pipe 88 back to the tank 36. At the same time, a portion of the pressure fluid flows through the branch pipe 106 to the pressure gauge 110 and also through the branch pipe 124 to the pressure-responsive spiral operating tube 128 of the recording needle device 130. The consequent turning of the shaft 174 by the vane 189 of the hydraulic torsion motor 104 causes rotation of the record supporting drum 164 or angle-of-twist indicator and its chart 160, while at the same time the pen 158 on the needle 152 swings back and forth to indicate the pressure variation on the chart 160, and also the amount of twist, preferably in degrees graduated on the chart 160. Meanwhile, the prevailing pressure is also indicated visually by the position of the needle 112 on the graduated scale 116 of the dial 122 of the pressure gauge 110.

The turning of the shaft 174 of the hydraulic torsion motor 104 also turns the rotary jaw 194 relatively to the stationary jaw 210, thereby twisting the sample or specimen S. When the material of the latter approaches its elastic limit, the pressure in the hydraulic circuit starts to drop because of the yielding thereof, resulting in a dip or loop occurring in the line traced out by the pen 158 on the chart 160. This action indicates not only the pressure at which failure occurs but also the nature of the pressure change, and the range, in degrees, over which the failure of the material extends. Meanwhile, the flow control valve 60 regulates the flow of pressure fluid from the pump 32 to the hydraulic torsion motor 104 by way of the four-way valve 64 and the relief valve 44 stands ready to "blow" or open in case excessive pressures develop, thereupon discharging the excess of pressure fluid through the drain pipe 56 back to the tank 36. When the sample or specimen S has broken under the above torsion, the operator shifts the four-way valve 64 to its "off" or neutral position by means of the handle 76.

When the test has been completed, to return the rotary jaw 194 to its starting position, the operator shifts the handle 76 by the knob 78 to reverse the setting of the four-way valve 64, reversing the flow to the hydraulic torsion motor 104. The vane or rotor 189 and the shaft 174 of the latter then return to their original positions with the sample or specimen holding grooves 200 and 202 of the specimen holder 196 aligned with one another. The graph produced on the chart 160 gives a measure of inch pounds of torque applied to the specimen or sample S and the angle of twist taken by the sample.

In operating the torsion testing machine 10 of the present invention, it is important to align the opposing grooves 200 and 202 accurately before inserting the specimen or sample S, and to install the latter in such a manner as to be sure that it is resting against the bottom of each jaw groove 200 and 202. The electric motor 20 is then de-energized by throwing the switch 22 to its "off" position, halting the discharge of pressure fluid from the pump 32.

What I claim is:

1. A machine for torsionally testing a sample of material comprising a support, a stationary sample gripper mounted on said support, a rotary sample gripper mounted on said support in aligned spaced relationship with said stationary sample gripper, a rotary hydraulic torsion motor mounted on said support, said torsion motor having a rotor therein and a rotary shaft drivingly connected to said rotor and to said rotary sample gripper, a sample angle-of-twist indicator operatively connected to said shaft, a power-driven hydraulic pump, hydraulic pressure measuring means, and a hydraulic circuit operatively connecting said hydraulic pump to said hydraulic torsion motor and to said hydraulic pressure measuring means, said hydraulic pressure measuring means and angle-of-twist indicator including a rotary record holder operatively connected to said shaft, a hydraulic pressure-responsive scriber actuator hydraulically connected to said circuit, and a scriber disposed in scribing relationship to said rotary record holder and operatively connected to said scriber actuator.

2. A torsion testing machine, according to claim 1, wherein said record holder also constitutes said angle-of-twist indicator.

3. A torsion testing machine, according to claim 1, wherein said rotary record holder is mounted on said shaft and rotates unitarily therewith and wherein a pressure-responsive scriber actuator is hydraulically connected to said hydraulic circuit and operatively connected to said scriber whereby said scriber and said rotary record-holder cooperatively indicate both the angle of twist of the sample under test and the hydraulic pressure required to produce that angle of twist.

4. A torsion testing machine, according to claim 1, wherein said hydraulic circuit includes a hydraulic fluid flow control valve connected between said hydraulic pump and said hydraulic torsion motor in fluid flow controlling relationship with said motor.

5. A torsion testing machine, according to claim 1, wherein said hydraulic torsion motor is a reversible motor and wherein said hydraulic circuit includes a hydraulic flow-reversing valve connected therewith between said hydraulic pump and said hydraulic torsion motor in fluid flow reversing relationship with said motor.

6. A torsion testing machine, according to claim 1, wherein said hydraulic torsion motor has forward and rearward ends and wherein said shaft extends through said hydraulic torsion motor and has forward and rearward ends projecting from the forward and rearward ends of said motor, and wherein the rotary sample gripper is mounted on one of said shaft ends and wherein the rotary record holder constituting the sample angle-of-twist indicator is mounted on the other of said shaft ends.

References Cited in the file of this patent

UNITED STATES PATENTS

| | | |
|---|---|---|
| 155,051 | Thurston | Sept. 15, 1874 |
| 1,804,621 | Irwin | May 12, 1931 |
| 1,937,077 | West | Nov. 28, 1933 |
| 2,594,136 | Di Maggio | Apr. 22, 1952 |
| 2,666,324 | Stott | Jan. 19, 1954 |